US010638404B1

(12) United States Patent
Chenault et al.

(10) Patent No.: US 10,638,404 B1
(45) Date of Patent: Apr. 28, 2020

(54) CONTROLLED-ENVIRONMENT FACILITY MOBILE DEVICE LOCATION TRACKING

(71) Applicant: Securus Technologies, Inc., Carrollton, TX (US)

(72) Inventors: Michael Chenault, McKinney, TX (US); Daniel Wright, Little Elm, TX (US); Robert E. Day, Lewisville, TX (US); Scott D. Passe, Forney, TX (US); Kendrick Sims, Mansfield, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/218,957

(22) Filed: Dec. 13, 2018

(51) Int. Cl.
*H04W 48/04* (2009.01)
*H04W 4/029* (2018.01)
*H04W 12/00* (2009.01)
*H04W 12/08* (2009.01)
*H04W 48/20* (2009.01)

(52) U.S. Cl.
CPC .......... *H04W 48/04* (2013.01); *H04W 4/029* (2018.02); *H04W 12/00503* (2019.01); *H04W 12/0802* (2019.01); *H04W 48/20* (2013.01)

(58) Field of Classification Search
CPC ..... H04W 48/04; H04W 48/20; H04W 4/029; H04W 12/00503; H04W 12/0802
USPC ...................................................... 455/456.5
See application file for complete search history.

(56) References Cited

U.S. PATENT DOCUMENTS

| | | | |
|---|---|---|---|
| 6,832,093 B1* | 12/2004 | Ranta ............ | H04W 48/04 455/422.1 |
| 2008/0057976 A1* | 3/2008 | Rae ............... | H04W 64/003 455/456.1 |
| 2008/0157972 A1* | 7/2008 | Duron ............ | G01S 13/75 340/572.1 |
| 2012/0127976 A1* | 5/2012 | Lin ................ | G01S 13/82 370/338 |
| 2014/0223553 A1* | 8/2014 | Gupta ........... | G06F 21/52 726/22 |
| 2014/0266585 A1* | 9/2014 | Chao ............. | G07C 9/00111 340/5.61 |
| 2015/0077221 A1* | 3/2015 | Peters ........... | G07F 17/00 340/5.28 |

* cited by examiner

*Primary Examiner* — William Nealon
(74) *Attorney, Agent, or Firm* — Fogarty LLP (57) ABSTRACT

A communication device may be assigned to a resident of a controlled-environment facility. A data network interface of the resident device establishes a connection with a resident network via one or more network access points located within the facility. A tracking network interface of the resident device transmits location tracking signals received by location tracking devices located within the facility. The resident device connects with the resident network via the data network interface in providing services to the resident. During intervals when the resident device is not connected to the resident network via the data network interface, tracking network interface is used to transmit the location tracking signals.

20 Claims, 3 Drawing Sheets

CONTROLLED-ENVIRONMENT FACILITY MOBILE DEVICE LOCATION TRACKING

TECHNICAL FIELD

The following description relates generally to communications devices provided to residents of a controlled-environment facility, and more particularly to location tracking of communications devices provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may have opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide other types of monitored visitation sessions, including audio conferences, video conferences, video messages, email, and online chat sessions. More recently, visitation sessions may be conducted via portable communications devices issued to inmates on a temporary or permanent basis.

In addition to providing increased opportunities for visitations, additional services may be provided to inmates via an issued portable communications device. For instance, a portable communications device may provide residents with educational and counseling services. A portable communications device may also be used to provide residents with entertainment services, such as gaming services and access to digital content. The availability of such services may be limited based on bandwidth limitations within a controlled-environment facility. In many scenarios, the demand for wireless bandwidth within a controlled-environment facility far exceeds the bandwidth that is actually available.

BRIEF SUMMARY

According to various embodiments, a communications device provides services to a resident of a controlled-environment facility. The communications device includes a data network interface configured to establish a connection with a resident network via one or more network access points located within the controlled-environment facility; a tracking network interface configured to transmit location tracking signals received by a plurality of location tracking devices located within the controlled-environment facility; a memory device configured to store operating system program instructions; and one or more processors configured to execute the operating system program instructions, causing the communications device to connect with the resident network via the data network interface, wherein data transmitted via the data network interface connection provides the services to the resident.

In additional communication device embodiments, the operating system program instructions further cause the communication device to direct the tracking network interface to transmit the location tracking signals during intervals when the communication device is not connected to the resident network via the data network interface. In additional communication device embodiments, the tracking network interface detects the location request signals broadcast by the location tracking devices. In additional communication device embodiments, the resident is restricted to use of a first portion of the services during intervals when the communication device is not connected to the resident network. In additional communication device embodiments, the services comprising the first portion of the services are determined based on a privilege status of the resident. In additional communication device embodiments, the location tracking devices comprise fixed-location communication devices configured for participating in remote visitation sessions. In additional communication device embodiments, the location tracking devices comprise readers that are used to control access to portions of the controlled-environment facility. In additional communication device embodiments, the location of the communications device within the controlled-environment facility is determined based on locations of the wireless access points by which the data network interface connects to the resident network, and further based on locations of the location tracking devices that detect the location tracking signals transmitted by the tracking network interface.

According to various additional embodiments, a system provides a resident of a controlled-environment facility with services. The system includes: one or more network access points providing access to a resident network; a plurality of fixed-location communication devices configured for participating in remote visitation sessions and further configured to receive location tracking signals transmitted by a portable resident communication device; and a portable resident communications device assigned to the resident, wherein the portable communications device is configured to connect with the resident network via the network access points, wherein data transmitted via the resident network provides the services to the resident.

In additional system embodiments, the portable communications device is further configured to direct the tracking network interface to transmit the location tracking signals during intervals when the communication device is not connected to the resident network via the data network interface. In additional system embodiments, the portable communications device is further configured to detect the location request signals broadcast by the fixed-location communication devices. In additional system embodiments, a location tracking system is configured to track the location of the portable communications device within the controlled-environment facility based on locations of the wireless access points by which the data network interface connects to the resident network, and further based on locations of the fixed-location communication devices that detect the location tracking signals transmitted by the portable communications device. In additional system embodiments, the location tracking system is configured to detect movement of the resident communication device within the controlled-environment facility without detecting corresponding movements by the resident. In additional system embodiments, the resident is restricted to use of a first portion of the services during intervals when the communication device is not connected to the resident network.

According to various additional embodiments, a method provides a resident of a controlled-environment facility with services via a portable communications device utilized by the resident. The method includes: establishing a connection, by a data network interface of a portable communication device, with a resident network via one or more network access points located within the controlled-environment facility, wherein data transmitted via the data network interface connection provides the services to the resident; transmitting location tracking signals by a tracking network interface of the portable communication device; receiving the location tracking signals, by a plurality of fixed-location communication devices located within the controlled-environment facility; and tracking the location of the portable communications device within the controlled-environment facility based on locations of the wireless access points by which the data network interface connects to the resident network, and further based on locations of the fixed-location communication devices that detect the location tracking signals transmitted by the portable communications device.

Additional method embodiments include directing the tracking network interface to transmit the location tracking signals during intervals when the communication device is not connected to the resident network via the data network interface. In additional method embodiments, the portable communications device is further configured to detect location request signals broadcast by the fixed-location communication devices. Additional method embodiments include detecting movement of the resident communication device within the controlled-environment facility without detecting corresponding movements by the resident. In additional method embodiments, the resident is restricted to use of a first portion of the services during intervals when the portable communication device is not connected to the resident network. In additional system embodiments, the services comprising the first portion of the services are determined based on a privilege status of the resident.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, embodiments may be implemented within various types of controlled-environment facilities, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), certain educational facilities, and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

As described above, a portable communication device may be assigned for use by a resident of a controlled environment facility. In such scenarios, the bandwidth that is available for use by the portable communication devices may be highly limited. The bandwidth available within the controlled-environment facility may be prioritized for supporting visitation sessions with nonresidents. Accordingly, the portable communication devices may be configured to provide residents with access to certain features and programs, such as games and offline education and counseling, even when the portable communication device is not connected to the resident network that supports the portable communication devices. The portable communication devices may thus be used by residents while only intermittently connected to the resident network. Providing live tracking of the location of portable communication devices allows tracking of the resident within the controlled environment facility even though the portable communication device is not always connected to the resident network.

Figure 1:
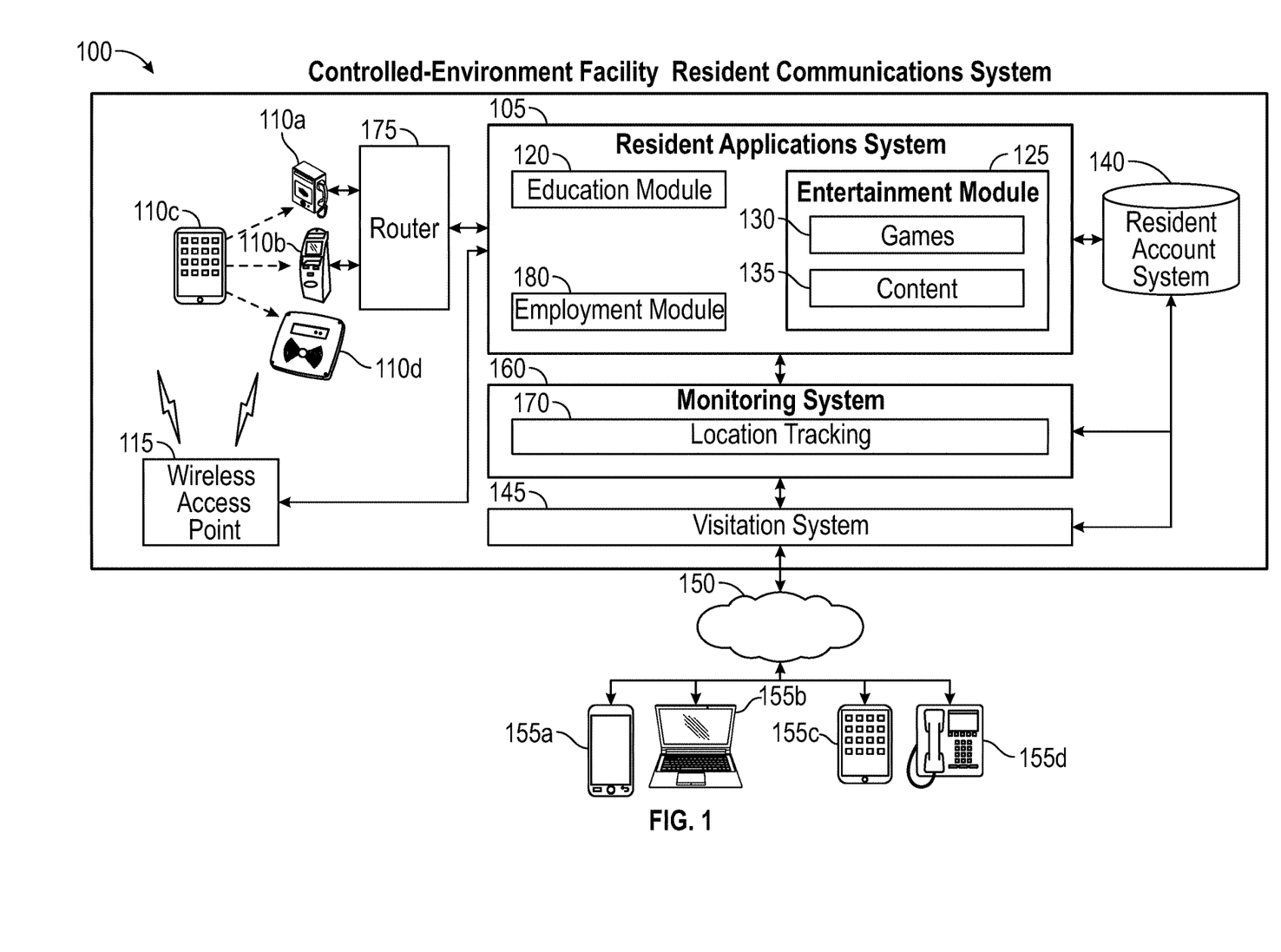
FIG. 1 is a diagram illustrating certain components of a system according to various embodiments for tracking the location of communications devices provided to residents of a controlled-environment facility.

FIG. 1 is a diagram illustrating certain components of a resident communications system 100 provided within a controlled-environment facility and configured according to various embodiments for supporting the tracking of the locations of portable communication devices within the controlled-environment facility. In a controlled-environment facility, the resident communications system 100 may provide residents with a variety of services. In certain instances, the resident may utilize the services provided by the resident communications system 100 via a resident communications device 110*a-c*. In the illustrated embodiment, resident communications system 100 provides residents with visitation session services via a visitation system 145, where the resident may utilize certain of these visitation session services via supported resident communications devices 110*a-c*, that may include a resident terminal 110*a*, a resident kiosk 110*b* and/or a portable communications device 110*c*. As illustrated, resident communications system 100 also provides residents with access to a resident applications system 105 that interfaces with the resident communications device 110*a-c* in order to provide various approved software applications to the resident, such as educational, employment, visitation and entertainment software. In various embodiments, resident communications system 100 may provide residents with a variety of additional services via a resident communications device 110*a-c*.

In certain embodiments, resident communications system 100 may be located within a controlled-environment facility, and may be used to provide communications services to residents located at that particular facility. Alternatively, some of the components of resident communications system 100 may be centrally and/or remotely located with respect to one or more controlled-environment facilities and be used to provide services to residents at multiple different facilities. For instance, monitoring system 160 and/or resident account system 140, may be remotely located and used in support of multiple resident communication systems 100 located at different facilities, while the remaining elements of system 100 are located within a specific controlled-environment facility and used to provide communication services to residents at that facility. Whether local to a particular controlled-environment facility or located remotely, resident communications system 100 may be used to provide communication services, including support for portable communication devices, to residents of multiple controlled-environment facilities.

One of the services provided to residents by the resident communications system 100 may include monitored visitation sessions. In the illustrated embodiment, visitation system 145 allows a resident, using resident communications device 110, to participate in a visitation session with a nonresident participating via a communications device 155*a-d* that connects to the visitation system 145 via an external network 150, such as the Internet. In various embodiments, the visitation system 145 may provide residents with a selection of different visitation session formats including audio conferences, audio messages, video conferences, video messages, email, online chats and/or text messaging services. In certain instances, the visitation formats available to a resident may depend on factors such as: the capabilities of the resident communications device 110*a-c*, the location of the resident within the facility, the resident's designated privilege classification within the controlled-environment facility, and restrictions on types of visitations that are allowed with specific nonresidents.

In the illustrated embodiment, the resident communications system 100 utilizes the resident account system 140 in enforcing security protocols that are applicable to the use of services provided to residents of the controlled-environment facility. For instance, in providing visitation services, the visitation system 145 may determine applicable restrictions based on data stored in the resident account system 140. In certain embodiments, the visitation system 145 may interoperate with the resident account system 140 to limit a resident's visitation sessions to sessions with non-residents whose identities are listed in that resident's Pre-Approved Contact (PAC) and/or Personal-Allowed Number (PAN) list. In some scenarios, the visitation system 145 may also enforce restrictions prohibiting a resident from contacting certain individuals identified in a "do not contact" list. The identity of a non-inmate may be represented on these lists by the phone number of the non-resident, the device presented for use by a non-resident and/or the email addresses or other accounts used by the non-resident. Each resident's PAC, PAN, and/or do not contact list(s) may be stored by the resident account system 140. In certain scenarios, resident account system 140 may also be used to store biometric information used to authenticate individual residents of the controlled-environment facility and/or non-residents that have been authorized for certain visitation system 145 services. In addition to PAC, PAN, and/or do not contact list(s), resident account system 140 may also store other security profiles and rules that are applicable to each resident. In certain embodiments, the PAC, PAN, and/or do not contact list(s) may be used to allow certain non-residents 155*a-d* to participate in certain services, such as counseling and gaming sessions, with the resident.

The resident account system 140 may also be used to manage information such as balances in a resident's trust, commissary, gaming and/or visitation services accounts. The resident account system 140 may also provide access to other information pertaining to a resident, including for instance a resident's trial schedule, conviction data, criminal record, sentencing data (such as time served, time remaining to be served, and projected release date), counseling history, screening history, cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the resident account system 140 may be one or more separate systems, or may be integrated as a component of the resident communications system 100.

Subject to various restrictions and limitations enforced by the visitation system 145, residents may participate in visitation sessions with one or more non-residents 155*a-d*. Nonresidents may utilize various communications devices in participating in visitation sessions. For instance, a non-resident may participate using a mobile phone 155*a*, tablet computing device 155*c*, a personal computer 155*b*, a traditional landline 155*d*, or other communications device capable of interfacing with the visitation system 145. In certain scenarios, a non-resident may participate in a voice visitation session hosted by the visitation system 145 via a traditional telephone via a Publicly Switched Telephone Network (PSTN) interface to the network 150. As described, various other visitation session formats may be supported by visitation system 145. Based on the hardware and software capabilities of the nonresident devices 155*a-d*, nonresidents may participate in voice, video and/or written (e.g., text, chat, email) visitation sessions.

In the illustrated embodiment, resident communications system 100 includes a monitoring system 160 configured to perform various monitoring operations related to the resident's use of the services provided by the system. In particular, the tools provided by the monitoring system may provide the ability to monitor resident's use of software applications provided via the resident applications system 105, such as the ability to monitor a resident's use of the described entertainment, visitation, education and employment services. In certain embodiments, the monitoring system 160 may include a location tracking module 170. As described in additional detail below, the various components of the resident communication system may be configured to track location signals generated by portable communication devices 110*c* issued to residents, thus providing support for tracking the location of the portable communication devices 110*c* within the controlled-environment facility.

In addition to the tracking the location of the portable resident communication devices 110*c* within the controlled-environment facility, the monitoring system 160 also provides various tools for automated and manual monitoring of visitation sessions conducted via the visitation system 145. The monitoring system 160 may include tools that allow staff to monitor live and recorded visitation sessions. The monitoring system 160 may record the visitation sessions conducted via the visitation system 145, such as by generating written transcripts, audio and/or video files of the visitation session. These recorded visitation sessions may be stored to a database maintained by the monitoring system 160. The monitoring system 160 may also provide tools that allow staff to mark and annotate events observed in a recorded visitation session. The monitoring system 160 may also provide tools that allow staff to search recorded visitation sessions in support of investigative activities. Additional monitoring may be provided by the monitoring system 160 via keyword detection, gesture recognition, and other tools intended to detect unauthorized or illicit behavior during a visitation session.

In certain embodiments, resident communications device 110c may be a portable, personal wireless device, such as a tablet device or a smartphone device. As described in additional detail with regard to the embodiment of FIG. 2, the portable communications device 110c may include a camera, display, microphone and speakers and may allow the resident to participate in visitation sessions supported by the visitation system 145, where such visitation sessions may include voice visitations, video sessions, email, online chats and/or text messaging services. In certain scenarios, a portable communications device 110c may be referred to as an Intelligent Resident Device (IRD), or in a correctional institution environment, as an Intelligent Inmate Device (IID). In certain scenarios, a portable communications device 110c may be sponsored, or otherwise subsidized, by organizations or companies that have contracted with the controlled-environment facility to provide services to residents of the facility.

The portable communications device 110c may be especially adapted in various manners for use in a controlled-environment facility. As described in additional detail with regard to the embodiment of FIG. 2, the portable communications device 110c may include various adaptations that prevent unauthorized use of the device by residents. Such adaptations may include various restrictions on the resident's use of services provided by the resident communications system 100. The portable communications device 110c may be assigned for use by a resident on a temporary or permanent basis.

A portable communications device 110c may be restricted with respect to the network connectivity that is provided by the resident communications system 100. In many scenarios, a portable communications device 110c may be configured to connect only to a specific wireless access point 115, or a specific network of wireless access points 115, provided by the resident communications system 100. In certain embodiments, a portable communications device 110c may be further restricted to connect only to networks available within certain areas of a controlled-environment facility, such as a dedicated visitation area or other supervised area. In certain scenarios, network connectivity for a portable communications device 110c may be limited by placing wireless access points 115 and positioning directional antenna within the physical structure of a controlled-environment facility such that the generated wireless signals are restricted to limited areas within the facility.

In certain embodiments, resident communications device 110a-c may be a resident terminal 110a. As with the portable communications device 110c, the resident terminal 110a may provide residents of a controlled-environment facility with voice, video and/or text interactive services. In certain scenarios, the resident terminal 110a may be mounted on a wall, within a booth, or as part of kiosk. In certain scenarios, the resident terminal 110a may be a hardened terminal and may be installed in an area of the controlled-environment facility 110 dedicated to providing residents with interactive sessions. In certain embodiments, resident terminal 110a may include a character-entry interface that allows data entry by residents and also allows residents to participate in text messaging or other text-based communication services. In certain embodiments, such a resident terminal 110a may be referred to as an Intelligent Facility Device (IFD).

In various embodiments, a resident terminal 110a may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident terminal 110a may be any suitable imaging device such as, a video camera or webcam equipped with Charge-Coupled Devices (CCDs) or Complementary Metal-Oxide-Semiconductor (CMOS) active pixel sensors. A handset may be similar to a traditional telephone handset, including an earpiece portion (with a speaker), a handle portion, and a mouthpiece portion (with a microphone). In certain embodiments, the resident terminal 110a may allow a resident to utilize a headset with earphones and a microphone in place of a traditional handset.

Figure 2:
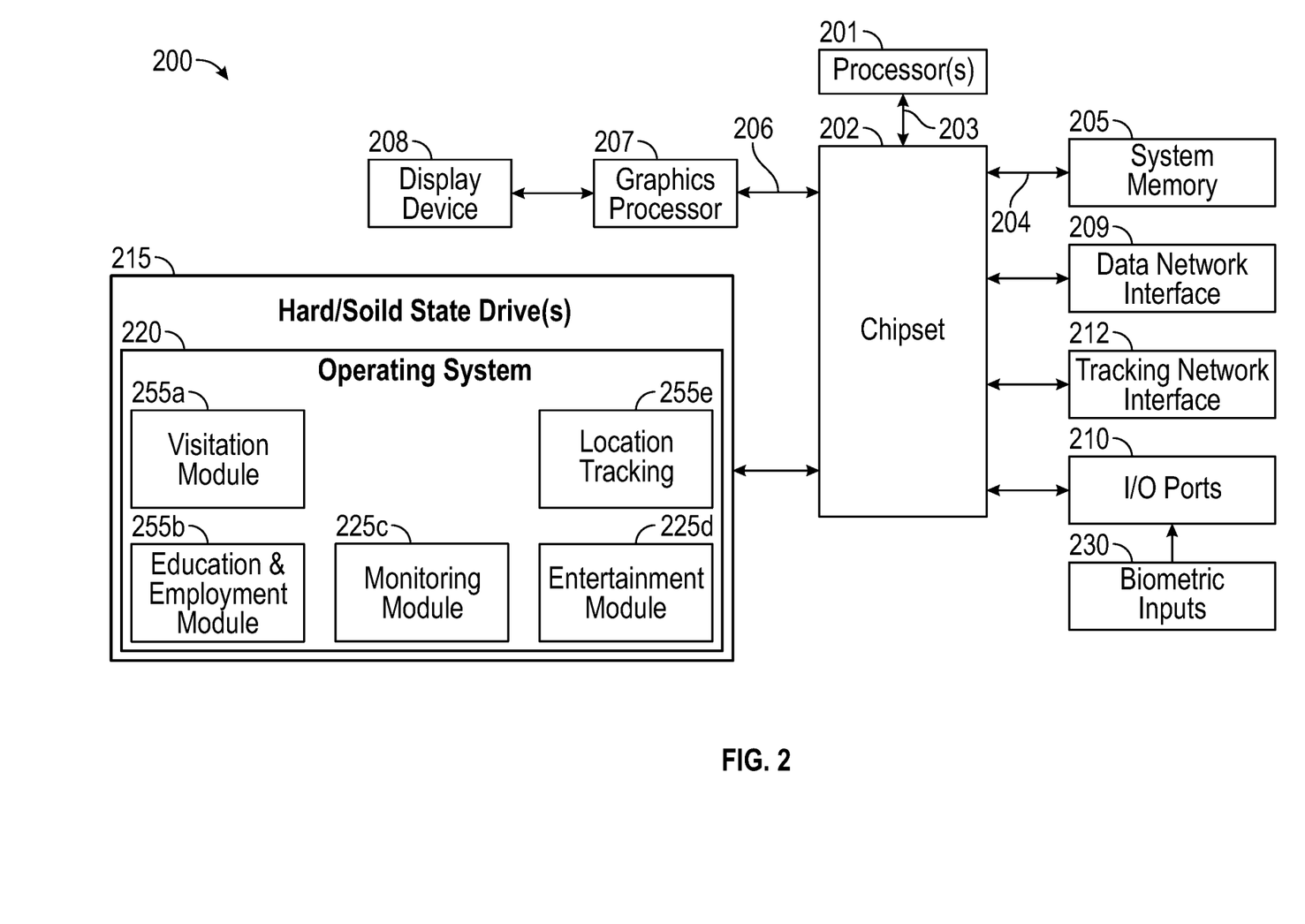
FIG. 2 is a diagram illustrating certain components according to various embodiments of a trackable, portable communications device provided to residents of a controlled-environment facility.
Figure 3:
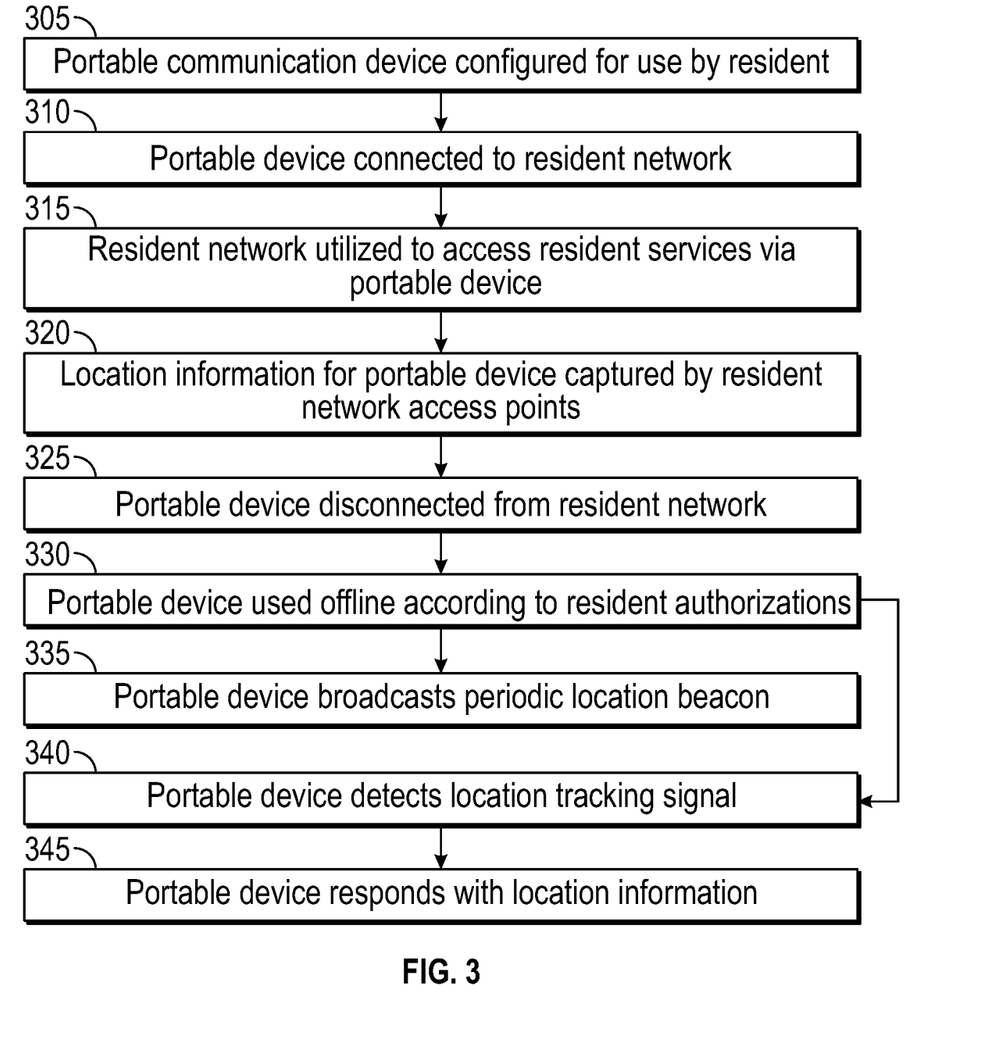
FIG. 3 is a flowchart diagram illustrating certain steps of process according to various embodiments for tracking the location of communications devices provided to residents of a controlled-environment facility.

As described in additional detail with regard to FIGS. 2 and 3, in certain embodiments, the resident terminal 110a may be configured to detect the presence of a portable communication device 110c in proximity to the resident terminal 110a. For instance, the resident terminal 110a may be configured to include a wireless transceiver, such as a BLUETOOTH, Zigbee, Z-WAVE or cellular transceiver configured to detect location signals broadcast by the portable communication device 110c while the portable communication device is within a certain proximity of the resident terminal 110a. In other embodiments, the wireless transceiver included in the resident terminal 110a may be configured to broadcast location tracking signals and to monitor for responsive location signals transmitted by the portable communication devices 110c while in proximity to the resident terminal 110a.

In certain embodiments, resident communications device 110a-c may be a resident kiosk 110b. As with the portable communications device 110c and the resident terminal 110a, the resident kiosk 110b may provide residents of a controlled-environment facility with voice, video and/or text communications services. In certain scenarios, the resident kiosk 110b may be located within a booth or other visitation area. The resident kiosk 110b may be formed from a hardened enclosure. In certain embodiments, resident kiosk 110b may include a keyboard or other character-entry interface that allows data entry and participation in text-based communication services. As with the resident terminal 110a, a resident kiosk 110b may include a video display, a camera, a microphone and speakers that may provide residents with the ability to participate in interactive sessions supported by the resident communications system 100, where such interactive sessions may include voice calls, video sessions, email, online chats and/or text messaging services.

As with the resident terminal 110a, a resident kiosk 110b may also be configured to detect the presence of a portable communication device 110c in proximity to a resident kiosk 110b. The resident kiosk 110b may similarly include a wireless transceiver, such as a BLUETOOTH, Zigbee, Z-WAVE or cellular transceiver configured to detect location signals broadcast by the portable communication device 110c while the portable communication device is within a certain proximity of the resident kiosk 110b. In other embodiments, the wireless transceiver of the resident kiosk 110b may be configured to broadcast location tracking signals and to monitor for responsive location signals transmitted by the portable communication devices 110c while in proximity to the resident kiosk 110b.

As illustrated in FIG. 1, the resident terminal 110a and resident kiosk 110b may be coupled to the resident applications system 105 via one or more routers 175. In other embodiments, the resident terminal 110a and resident kiosk 110b may be coupled to the resident applications system 105 via one or more additional network devices in addition to router 175. In certain embodiments, each resident terminal 110a and resident kiosk 110b may be coupled to a router 175 via a network cable, where the router 175 and network cable are secured from being accessed by residents.

As illustrated, the controlled-environment facility resident communications system 100 may also include a variety of different readers 110d located throughout the facility. For instance, transponders may include RFID (Radio Frequency Identification) readers that are configured to detect RFID transponders worn by residents and staff members of the controlled-environment facility. In certain embodiments, such RFID transponders may be utilized to authorize entry by residents and staff members into various areas of the controlled environment facility. For instance, a resident may be required to present an RFID bracelet to an RFID reader 110d in order to gain access to a kitchen area as part of a work assignment. Readers 110d may also include various wireless receivers and transceivers configured to collect location tracking information for portable communication devices 110c operated by residents.

As with the resident terminal 110a and the resident kiosk 110b, the readers 110d located throughout the facility may also be configured to detect the presence of a portable communication device 110c in proximity to a reader 110d. The readers 110d may similarly include a wireless transceiver, such as a BLUETOOTH, Zigbee, or Z-WAVE transceiver, configured to detect location signals broadcast by the portable communication device 110c while the portable communication device is within a certain proximity of the reader 110d. In other embodiments, the wireless transceiver of the readers 110d may be configured to broadcast location tracking signals and to monitor for responsive location signals transmitted by the portable communication devices 110c while in proximity to the readers 110d. In certain embodiments, readers 110d may include active RFID transponders that detect the presence of a passive RFID tag included within the portable communication device 110c. Embodiments of readers 110d may alternatively or additionally include passive RFID tags that are detected by active RFID transponders included in the portable communication device 110c.

As described, wireless access points 115 may be used to provide data network connectivity to residents utilizing portable communication devices 110c. In certain embodiments, wireless access points 115 may be additionally configured to detect the presence of a portable communication device 110c in proximity to the wireless access point 115, even if the wireless access point 115 is not providing the portable communication device 110c with network connectivity. For instance, the wireless access point 115 may include a wireless transceiver, such as a BLUETOOTH, Zigbee, Z-WAVE or cellular transceiver configured to detect location signals broadcast by the portable communication device 110c while the portable communication device is within a certain proximity of the wireless access point 115. In other embodiments, the wireless transceiver included in the wireless access point 115 may be configured to broadcast location tracking signals and to monitor for responsive location signals transmitted by the portable communication devices 110c while in proximity to the wireless access point 115.

As illustrated, the resident applications system 105 includes an education module 120, an employment module 180 and an entertainment module 125. These modules include software applications provided for use by residents and which may be utilized via a resident communications device 110a-c. The education module 120 may be one of many different modules provided for the education and training of residents. For instance, the education module 120 may provide a resident with access to recorded lectures, online classes, coursework materials, self-guided training courses, vocational training materials, job counseling services, job search services, and other such resources provided with the intent to rehabilitate and educate residents.

In certain scenarios, an employment module 180 may provide residents scheduled for release, or for participation in a work-release program, with employment search and application services. In certain embodiments, employment module 180 may provide residents with the ability to search for opportunities for employment outside of the controlled-environment facility. In addition, employment module 180 may provide residents with tools and resources for applying for job openings, such as completing application forms, drafting a resume and requesting letters of recommendation. Certain aspects of the employment module 180 may be configured for use within interactive sessions with non-residents.

In addition to providing access to educational and employment resources, the resident applications system 105 may include an entertainment module 125, by which entertainment software programs may be downloaded and run on a resident communications device 110a-c. In the illustrated embodiment, entertainment module 125 is comprised of a gaming module 130 and content module 135. The gaming module 130 may support the use of various games approved for residents of a controlled-environment facility. In certain scenarios, residents with particular privilege status classifications may be allowed access to certain games that are otherwise unavailable to other residents. The entertainment module 125 also includes a content module 135 that may be used to provide residents with various forms of digital content, such as recorded videos, live broadcasts, music files, access to streaming audio, and other audio and video content approved for residents of a controlled-environment facility. In certain embodiments, the content available to a particular resident may depend on a privilege status classification of the resident. For instance, residents having earned additional privileges and/or a low-risk classification may be allowed access to additional content via content module 135.

In certain embodiments, aspects of the entertainment module 125 may allow interactive non-resident participation, such as via a software application installed on the personal device 155a-d of the non-resident. For instance, the gaming module 130 may provide residents with access to games that support interactive participation by non-residents. In certain embodiments, the interactive gaming sessions hosted by the gaming module 130 may allow direct participation by a non-resident in certain games, thus allowing the non-resident to participate in a game in conjunction with a resident.

In various embodiments, the education 120, employment 180 and entertainment 125 modules may be individually configured for use by a specific resident on a specific portable communication device 110*c* assigned to that resident. In certain embodiments, certain aspects of these modules may be available for use to certain residents, such as based on a risk classification of the resident, via a portable communication device 110*c* during times when the portable communication devices 110*c* is not connected to the resident network via a wireless access point 115. As described in additional detail with regard to the embodiments of FIGS. 2 and 3, the location of the portable communication device 110*c* within the controlled-environment facility may be tracked during such intervals when the device is offline and is thus not connected to the resident network via a wireless access point 115.

In the embodiment of FIG. 1, the resident application system 105 is a component of the resident communications system 100. In certain embodiments, the resident application system 105 may be an external component of the resident communication system 100. In certain embodiments, one or more of the functions of the resident application system 105 may be provided by systems external to the resident communications system 100. In certain of such embodiments, one or more of the functions of the resident application system 105 may be provided by centralized systems external to the controlled-environment facility.

FIG. 2 is a block diagram illustrating certain components of a communications device 200 configured according to certain embodiments to support location-based tracking of the communications device within a controlled-environment facility. In various embodiments, the communications device 200 may correspond to a portable communications device 110*c*, such as described with respect to FIG. 1. In particular, the communications device 200 may be configured to support location-based tracking of the communications device within a controlled-environment facility. In particular, the communications device 200 may be configured to broadcast signals that may be used to track the location of the communications device 200 at various points within the controlled-environment facility.

In certain scenarios, the communications device 200 allows residents to utilize various services provided by the resident communications system, such as described with respect to FIG. 1. The communications device 200 may be configured to interoperate with the resident communications system to utilize software applications that have been approved, and in some cases modified, for use by residents of a controlled-environment facility. Also as described with regard to FIG. 1, in certain embodiments, the resident communications system may be configured such that the resident may utilize the communications device 200 to participate in visitation sessions, including audio and/or video visitation sessions.

In various embodiments, the communications device 200 may be installed within a hardened enclosure that prevents any modifications to the hardware of the device and also prevents any tampering with the device that could allow a resident to conceal contraband within the device. In certain embodiments, the communications device 200 may be a tablet device, such as portable communications device 110*c*, that is protected within a hardened case that allows the resident to handle and use the portable device, but prevents the resident from accessing any of the device's internal components.

In certain embodiments, one or more sensors, may be integrated into the communications device 200 in order to detect any attempts to compromise the enclosure of the device. In certain embodiments, the communications device 200 may be configured to issue an alert to the resident communications system if the sensors indicate any attempts by a resident to compromise the enclosure of the device. In certain embodiments, the communications device 200 may be configured to shut down upon the sensors detecting an attempt to compromise the device, or in response to the sensors detecting sudden movements indicative of a resident's rough handling of the device. Various additional features of the hardware and/or software of the communications device 200 may be modified in order to prevent unauthorized use of the device.

Communications device 200 may include one or more processors 201. In various embodiments, the communications device 200 may be a single-processor system including one processor 201, or a multi-processor system including two or more processors 201. Processor(s) 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communications device 200 may include a chipset 202 that may include one or more integrated circuits that are connected to processor(s) 201. In certain embodiments, the chipset 202 may utilize a QPI (QuickPath Interconnect) bus 203 for communicating with the processor(s) 201. Chipset 202 provides the processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to a graphics processor 207. In certain embodiments, graphics processor 207 may be comprised within a video or graphics card that has been installed as components of the portable communications device 200. Graphics processor 207 may be coupled to the chipset 202 via a graphics bus 206 such as provided by an AGP (Accelerated Graphics Port) bus, a PCIe (Peripheral Component Interconnect Express) bus. The graphics processor 207 generates display signals that are provided to a display device 208, such as a tablet display screen. In certain embodiments, the display device 208 may be a touchscreen display configured to receive manual inputs, such as finger gestures and/or stylus inputs.

The chipset 202 of the communications device 200 may also include one or more hard disk and/or solid-state drives 215. As illustrated, the operating system 220 of the communications device 200 may be stored in the hard disk and/or solid-state drive 215. The communications device 200 may be configured to operate using a specially-adapted operating system 220, or operating system kernel, that implements various security procedures, such as authentication of the resident using biometric sensor 230 inputs, such as voice print, fingerprint or other biometric input recognition. The operating system 220 of the communications device 200 may also restrict the software applications and services that may be used by a resident. The operating system 220 may also be configured to prevent the resident from installing or modifying any applications on the device, thus limiting the resident to the use of software programs authorized for use by the resident communications system.

As illustrated, chipset 202 may be coupled to two different network interfaces, a data network interface 209 and a tracking network interface 212. In certain embodiments, the data network interface 209 may support communications with the resident network, such as via the wireless access points 115 described with regard to FIG. 1. In such embodiments, data network interface 209 may be provided by a Network Interface Controller (NIC) that supports wireless communications, such as WI-FI communications based on the various IEEE 802.11 standards. Via the wireless access points 115, the data network interface 209 may be configured to connect the communications device 200 to a resident network that provides access to the resident application system 105 of FIG. 1. In this manner, the data network interface 209 provides a network connection by which the software modules 225a-e supported by the operating system 220 exchange data with the resident application system 105.

The communications device 200 may also support a tracking network interface 212. As described with regard to FIG. 1, various components of the resident communications system 100 may be configured to collect location tracking information from portable resident communication devices 100. As described, such location monitoring components may be included within visitation systems, such as kiosks and terminals, and may also be included within various tracking and access control components located throughout the facility. The tracking network interface 212 supported by the communications device 200 may support the transmission of such location information that may be collected by the various location monitoring components. In certain embodiments, the tracking network interface 212 may include one or more wireless network transceivers, such as a BLUETOOTH, Zigbee, Z-WAVE and/or cellular transceivers, that are configured to communicate with corresponding wireless network transceivers incorporated into the location monitoring components. As described in additional detail with regard to FIG. 3, the tracking network interface 212 may be configured to broadcast tracking information, and/or to respond to location tracking broadcasts, in support of tracking the location of the communications device 200 within the controlled environment facility.

In many scenarios, use of a communications device 200 may be limited based on security protocols implemented by the resident communications systems. For instance, the operating system 220 of the communications device 200 may be configured to require a resident to enter a PIN (Personal Identification Number) assigned to the resident before enabling use of the communications device 200 by the resident. In other embodiments, the communications device 200 may likewise remain disabled until a resident trying to use the device is authenticated via a biometric verification. In certain embodiments, the communications device 200 may be configured to disable certain functions of the device or of the resident software applications installed on the device until the resident is authenticated, such as using voice print recognition of a voice sample provided by the resident in response to a prompt generated by the operating system 220. In the illustrated embodiment, the chipset 202 is configured to utilize I/O ports 210 that support biometric input devices 230, such as a fingerprint reader or a retinal scanner. In certain embodiments, the operating system 220 may boot upon initialization of the communications device 200, but may require authentication of the resident via biometric inputs 230 in order to enable the resident's use of the communications device 200.

In certain embodiments, a communications device 200 may include an RFID (Radio Frequency Identification) reader that is configured to detect RFID transponders worn by residents of the controlled-environment facility. The incorporation of the RFID reader into the communications device 200 provides the ability to authenticate an inmate using the communications device 200. In certain embodiments, the RFID reader of the communications device 200 may be configured to receive reports of biometric information collected from sensors included in the RFID transponder device worn by a resident.

As described with respect to FIG. 1, the resident communications system may support the use of resident applications, such as education, employment, entertainment and visitation applications. Referring to FIG. 2, upon booting of the communications device 200, and upon instantiation and execution of the operating system instructions 220 stored in the storage drive 215, the operating system 220 provides the resident with access to various software modules, such as a visitation module 225a, an education and employment module 225b and an entertainment module 225d. Certain of these software modules may be installed on the communications device 200, but may remain fully or partially disabled until the resident has been approved for use of the modules.

In certain instances, a resident may be restricted to using some of these software modules, or certain aspects of these software modules, while the communications device 200 remains connected to the resident network. However, the communication device 200 may be configured to allow the resident access to some of these software modules, or some aspects of these software modules, while the communication device is not connected to the resident network. For instance, in certain instances, any use of the visitation module 225a may require a connection to the resident network. In such instances, even visitation module 225a functions such as recording an audio or video message for a non-resident may require an active connection to the resident network in order to detect unauthorized use of the recording features of the communications device 200. Conversely, other software modules, such as certain games available through the entertainment module 225d, may remain available to the resident even when the communications device 200 is not connect to the resident network.

The software modules supported by operating system 220 may include an education and employment module 225b that provides residents with access to various educational and employment services and resources, such as described with regard to the education module 120 and employment module 180 of the resident application system 105 of FIG. 1. The software modules supported by operating system 220 may also include a visitation module 225a that allows the resident to participate in visitation sessions, such as the visitation sessions described with respect to FIG. 1. In certain embodiments, the visitation module 225a may provide residents with ability to request, schedule and participate in live visitation sessions, such as voice calls and video conferences. In such embodiments, the visitation module 225a may include user interface elements that allow the resident to interface with the visitation system 145 and the resident account system 140 in performing visitation functions such as requesting a visitation session, determining whether the requested visitation is allowed and scheduling a visitation session. The visitation module 225a may also include audio and video capabilities that allow the resident to participate in audio and video visitation sessions.

Embodiments of the visitation module 225a may also enable residents to participate in other types of visitations, such as e-mail, text messaging and the exchange of voice and video messages.

In addition to software modules, such as the visitation 225a, education and employment 225b and entertainment 225d modules, that are used directly by the resident, the operation system 220 may also include various applications that are not accessible by resident. As illustrated, the operating system 220 may also include a monitoring module 225c that enforces rules and restrictions on the resident's use of the portable communications device 200 and the services provided via the resident application system 105 and the software modules installed on the device. For instance, monitoring module 225c may be configured to allow staff to remotely enable live video and/or audio streams captured from the camera and/or microphone of the portable communications device 200. Monitoring module 225c may also interoperate with the monitoring system 160 utilized by the visitation system 145 in enforcing rules and restrictions in the resident's participation in visitation sessions using the portable communications device 200.

Another protected application supported by the operating system 220 may include a location tracking module 225e. As with the monitoring module 225c, the location tracking module 225e may be inaccessible to the resident using the communications device 200. In certain embodiments, the location tracking module 225e may be configured to monitor whether the portable communications device 200 is currently connected to the resident network via the data network interface 209. Upon detecting a disconnection of the data network interface 209, the location tracking module 225e may be configured to periodically signal location tracking broadcasts via the tracking network interface 212 and/or to respond to location request signals generated by location tracking components of the resident communications system 100.

In various embodiments, a communications device 200 does not include each of the components shown in FIG. 2. In various embodiments, communications device 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

FIG. 3 is a flowchart diagram illustrating certain steps of a process according to various embodiments for tracking the location of communications devices provided to residents of a controlled-environment facility. The illustrated embodiment begins at block 305 with the configuration of a portable communication device for use by a specific resident. As described, a portable communication device may provide a resident with access to various software modules, including visitation, entertainment, education and employment modules. In certain embodiments, specific software modules may be configured for use on a portable communication device by a resident based on a privilege status classification of the resident. In addition, the privilege status classification of a resident may serve as a basis for allowing the resident access to certain software modules during periods where the portable communication device is not connected to resident network. The portable communications device may thus be configured to enforce such restrictions on off-line use of the device for the resident to which the device is being assigned.

With the portable communication device configured for use by a particular resident, at block 310, the portable device may establish a connection with the resident network. As described, a portable communication device may access a resident network via wireless access points located throughout a controlled environment facility. At block 315, the resident network may be utilized by the portable communication device to access services offered via the resident communications system. For instance, the resident may utilize the portable communication device to participate in a visitation session with a nonresident, where the portable communication device may interface with the visitation system using a data network interface, such as a network interface controller configured to access the resident network via the wireless access points.

During such periods where the portable communication device is connected to the resident network via the wireless access points, the location tracking system 170 described with regard to FIG. 1 may be configured, in one illustrative technique, to track the location of the portable communication device based on the locations of the wireless access points by which the portable communication device accesses the resident network, Accordingly, at block 320, the location tracking system may monitor the wireless access points used by the portable communication device in order to capture information regarding the location of the portable communication device while the device is connected to the resident network.

However, as described above, in many controlled environment facilities, bandwidth for use by portable communication devices may be very limited, such that certain software applications may be used by a resident while off-line from the resident network. As described, limited bandwidth availability within a controlled environment facility may result in prioritization of bandwidth for certain resident services such as visitation sessions. Accordingly, at block 325, the portable communication device is disconnected from the resident network. For residents authorized for off-line use of a portable communication device, at block 330, the residents may continue using certain applications on the portable communication device, such as the entertainment, education and employment services supported by the resident communication system.

While operating off-line, at block 335, the portable device may periodically broadcast location signals. In certain embodiments, the location signal may specify the portable communication device that is transmitting the location signal. Alternatively or additionally, at block 340, the portable communication device may utilize a tracking network interface 212 to detect location request signals broadcast by location tracking devices, such as the communication devices and readers described with regard to FIG. 1, in order to track the location of the device within the facility. Upon detecting such a location request signal, at block 345, the portable communication device may transmit a responsive message that identifies the portable communication device.

In certain embodiments, the location tracking system 170 may be configured to further track the location of the portable communication device based on the locations of the location tracking devices that have detected location tracking signals transmitted by the portable communications device. In this manner, the location tracking system may continue to track the location of a portable communications device within a controlled-environment facility, even if the device is never or only sporadically connected to the resident network.

As described, a portable communication device may be assigned to a particular resident. In such scenarios, only the resident to which portable communication device is assigned may use that portable communication device. In support of detecting unauthorized use of portable communication devices, the location tracking system may be configured to detect situations where a portable communication device is being moved within the controlled environment facility without corresponding movements by the resident to which the portable communication device has been assigned. As described, residents of a controlled environment facility may be tracked via various wireless technologies in order to authorize the movement of the residents within the facility. For example, RFID bracelets may be worn by residents and may be detected using various RFID detectors located throughout the facility and/or using handheld RFID detectors operated by facility staff. In certain embodiments, the location tracking system may be configured to utilize such resident tracking systems in order to determine whether the resident to which a portable communication device has been assigned is detected as moving through the facility separately from the portable communication device, thus indicating potential unauthorized use of the portable communications device.

In additional embodiments, the location tracking system may further track the location of a resident and the location of a portable communication device assigned to the resident and may detect scenarios where the portable communication device is in use at a location different from the location of the resident. In this manner, use of a stolen portable communication device and/or attempts to impersonate another resident in order to gain access to their portable communication device may be quickly identified. In certain embodiments, the location tracking system may be configured to issue an alert if such unauthorized use of a portable communication device is indicated based on the locations of the use and the resident assigned to the device. In certain embodiments, such tracking may utilize a threshold distance between the resident and the portable device beyond which unauthorized use of the device may be indicated. Detected separation of the resident and the device that falls below this threshold distance may allow for distinct locations being reported for the resident and the device by different tracking devices within the same general area. For instance, a RFID reader at the entrance to a visitation area may report a first location for the resident and a location tracking report by a resident terminal may report the location of the portable device at a second location within that visitation area.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A communications device for providing services to a resident of a controlled-environment facility, the communications device comprising:
    a data network interface configured to establish a connection with a resident network via one or more network access points located within the controlled-environment facility;
    a tracking network interface configured to transmit location tracking signals received by a plurality of location tracking devices located within the controlled-environment facility;
    one or more memory devices configured to store operating system program instructions and digital content for use during intervals when the communication device is not connected to the resident network via the data network interface; and
    one or more processors configured to execute the operating system program instructions, causing the communications device to connect with the resident network via the data network interface, wherein data transmitted via the data network interface connection provides the services to the resident, wherein the services offered to the resident are limited based on the location tracking signals transmitted by the tracking network interface.

2. The communications device of claim 1, wherein the operating system program instructions further cause the communication device to direct the tracking network interface to transmit the location tracking signals during intervals when the communication device is not connected to the resident network via the data network interface.

3. The communications device of claim 1, wherein the tracking network interface detects location request signals broadcast by the location tracking devices.

4. The communications device of claim 1, wherein the resident is restricted to use of a first portion of the services during intervals when the communication device is not connected to the resident network.

5. The communications device of claim 4, wherein the services comprising the first portion of the services are determined based on a privilege status of the resident.

6. The communications device of claim 1, wherein the location tracking devices comprise fixed-location communication devices configured for participating in remote visitation sessions.

7. The communications device of claim 6, wherein the location tracking devices comprise readers that are used to control access to portions of the controlled-environment facility.

8. The communications device of claim 1, wherein the location of the communications device within the controlled-environment facility is determined based on locations of the wireless access points by which the data network interface connects to the resident network, and further based on locations of the location tracking devices that detect the location tracking signals transmitted by the tracking network interface.

9. A system for providing a resident of a controlled-environment facility with services, the system comprising:
    one or more network access points providing access to a resident network;
    a plurality of fixed-location communication devices configured for participating in remote visitation sessions and further configured to receive location tracking signals transmitted by a portable resident communication device; and a portable resident communications device assigned to the resident, wherein the portable communications device is configured to connect with the resident network via the network access points, wherein data transmitted via the resident network provides the services to the resident, wherein the services offered to the resident are limited based on the location tracking signals transmitted by the portable resident communication device, wherein some of the services offered to the resident may be accessed during intervals when the communication device is not connected to the resident network via the data network interface.

10. The system of claim 9, wherein the portable communications device is further configured to direct a tracking network interface to transmit the location tracking signals during intervals when the communication device is not connected to the resident network via the data network interface.

11. The system of claim 9, wherein the portable communications device is further configured to detect location request signals broadcast by the fixed-location communication devices.

12. The system of claim 9, further comprising:

a location tracking system configured to track the location of the portable communications device within the controlled-environment facility based on locations of the wireless access points by which the data network interface connects to the resident network, and further based on locations of the fixed-location communication devices that detect the location tracking signals transmitted by the portable communications device.

13. The system of claim 12, wherein the location tracking system is configured to detect movement of the resident communication device within the controlled-environment facility without detecting corresponding movements by the resident.

14. The system of claim 8, wherein the resident is restricted to use of a first portion of the services during intervals when the communication device is not connected to the resident network.

15. A method for providing a resident of a controlled-environment facility with services via a portable communications device utilized by the resident, the method comprising:

establishing a connection, by a data network interface of a portable communication device, with a resident network via one or more network access points located within the controlled-environment facility, wherein data transmitted via the data network interface connection provides the services to the resident;

transmitting location tracking signals by a tracking network interface of the portable communication device;

receiving the location tracking signals, by a plurality of fixed-location communication devices located within the controlled-environment facility; and tracking the location of the portable communications device within the controlled-environment facility based on locations of the wireless access points by which the data network interface connects to the resident network, and further based on locations of the fixed-location communication devices that detect the location tracking signals transmitted by the portable communications device;

limiting the services offered to the resident based on the location of the portable communications device; and providing certain services to the residence during intervals when the communication device is not connected to the resident network via the data network interface.

16. The method of claim 15, further comprising:

directing the tracking network interface to transmit the location tracking signals during intervals when the communication device is not connected to the resident network via the data network interface.

17. The method of claim 16, wherein the portable communications device is further configured to detect location request signals broadcast by the fixed-location communication devices.

18. The method of claim 15, further comprising:

detecting movement of the resident communication device within the controlled-environment facility without detecting corresponding movements by the resident.

19. The method of claim 15, wherein the resident is restricted to use of a first portion of the services during intervals when the portable communication device is not connected to the resident network.

20. The method of claim 19, wherein the services comprising the first portion of the services are determined based on a privilege status of the resident.

* * * * *